Aug. 8, 1967 M. D. ROUSH ETAL 3,334,684

COOLING SYSTEM FOR DATA PROCESSING EQUIPMENT

Filed July 8, 1964 3 Sheets-Sheet 1

INVENTORS
MAURICE D. ROUSH
EARL A. MAZOROL, JR.
By Cushman, Darby & Cushman
ATTORNEYS INVENTORS
MAURICE D. ROUSH
EARL A. MAZOROL, JR.
By
Cushman, Darby & Cushman
ATTORNEYS INVENTOR
MAURICE D. ROUSH
EARL A. MAZOROL, JR.
BY Cushman, Darby & Cushman
ATTORNEYS

United States Patent Office 3,334,684
Patented Aug. 8, 1967

3,334,684
COOLING SYSTEM FOR DATA PROCESSING EQUIPMENT

Maurice D. Roush, Chippewa Falls, Wis., and Earl A. Mazorol, Jr., Bloomington, Minn., assignors to Control Data Corporation, Minneapolis, Minn., a corporation of Minnesota

Filed July 8, 1964, Ser. No. 381,100
6 Claims. (Cl. 165—47)

This invention relates to a cooling system for data processing equipment and more particularly, to a liquid cooling arrangement designed to dissipate component heat from the logic and storage modules of a high-speed computer.

In the field of high-speed data processing, a very important consideration in the design and structure of the equipment is adequate provision for cooling of the unit. This is necessary due to the fact that the operating characteristics of electrical elements utilized in the construction of the circuitry of the computer are sensitive to heat, as is the ferro-magnetic material utilized in the memory storage devices which form an integral part of most present day computers. Due to the fact that extremely high-speed circuitry operation is employed in a computer, and since the design of the circuitry is dependent on an accurate determination of the operating times of the various circuitry components, it becomes necessary to closely control the temperature of these components to insure that they function properly within prescribed times. It is also necessary to predict the operation of the storage system which is dictated by the magnetic characteristics thereof. Therefore, the temperature of the storage arrangement must also be controlled.

With these considerations in mind, data processing units in the past have been constructed with reliance principally upon various forced air cooling arrangements wherein the storage and circuitry elements within a machine chassis have been exposed to cooling air directed past the elements by suitable blowing devices. These prior art cooling arrangements have been unsatisfactory principally due to the fact that it is extremely difficult to maintain a constant temperature throughout the chassis of the data processing equipment. Consequently, temperature differentials between various sections of the equipment are created.

It is to overcome the deficiencies of prior art arrangements that the improved cooling system of this invention has been developed. The invention overcomes the shortcomings of prior arrangements by providing a more constant temperature control throughout the entire data processing unit.

Another object of the invention is to provide a liquid coolant for computer components which does not require the additional equipment necessary with forced air systems.

It is a further object of the invention to provide a cooling system wherein each logic or storage module of the data processing equipment is cooled individually.

A still further object of the invention is to provide a cooling system which will not be adversely affected by opening of chassis doors for maintenance purposes.

An additional object is to provide a cooling system which also serves a secondary purpose of isolating individual logic and storage modules to thereby eliminate module cross-talk and to provide electrical shielding for each module.

Further objects and the entire scope of the invention will become more fully apparent when considered in light of the following detailed description of an illustrative embodiment of the invention and from the appended claims.

The illustrative embodiment will be best understood by reference to the accompanying drawings, wherein.

Briefly, the invention comprises an arrangement for dividing a computer chassis into a number of sections or compartments for receiving logic and/or storage modules. This is accomplished by mounting a plurality of spaced aluminum bars extending longitudinally of the chassis within the same. The area between adjacent bars is divided into compartments by means of a plurality of transversely extending plates mounted in a vertical plane between the longitudinal bars. Within these compartments are positioned the logic and/or storage modules which are fixed to the chassis by securing module face plates to the aluminum bars. Each of the longitudinal bars is provided with an internal channel through which a coolant may be passed, the channel extending longitudinally of the bar. The channels of adjacent cooling bars are interconnected to form a series path, and coolant is passed through the channels by means of a conventional refrigeration system external of the chassis. The transversely extending vertical plates which separate the spaces between adjacent longitudinally extending cooling bars are heat conductive. The distance between the module circuit board and the transversely extending vertical plates is held to a minimum so that a relatively large portion of heat, dissipated from the electrical components of the module, is transferred primarily by conduction and secondarily by radiation through the medium to the vertical plates which then conduct the heat to the aluminum cooling bars. Additional heat is directed to the cooling bars directly, or indirectly through the modules, face plates and the chassis. Heat is removed from the cooling bars by means of liquid coolant which passes through the cooling pipes within the bars.

Figure 1:
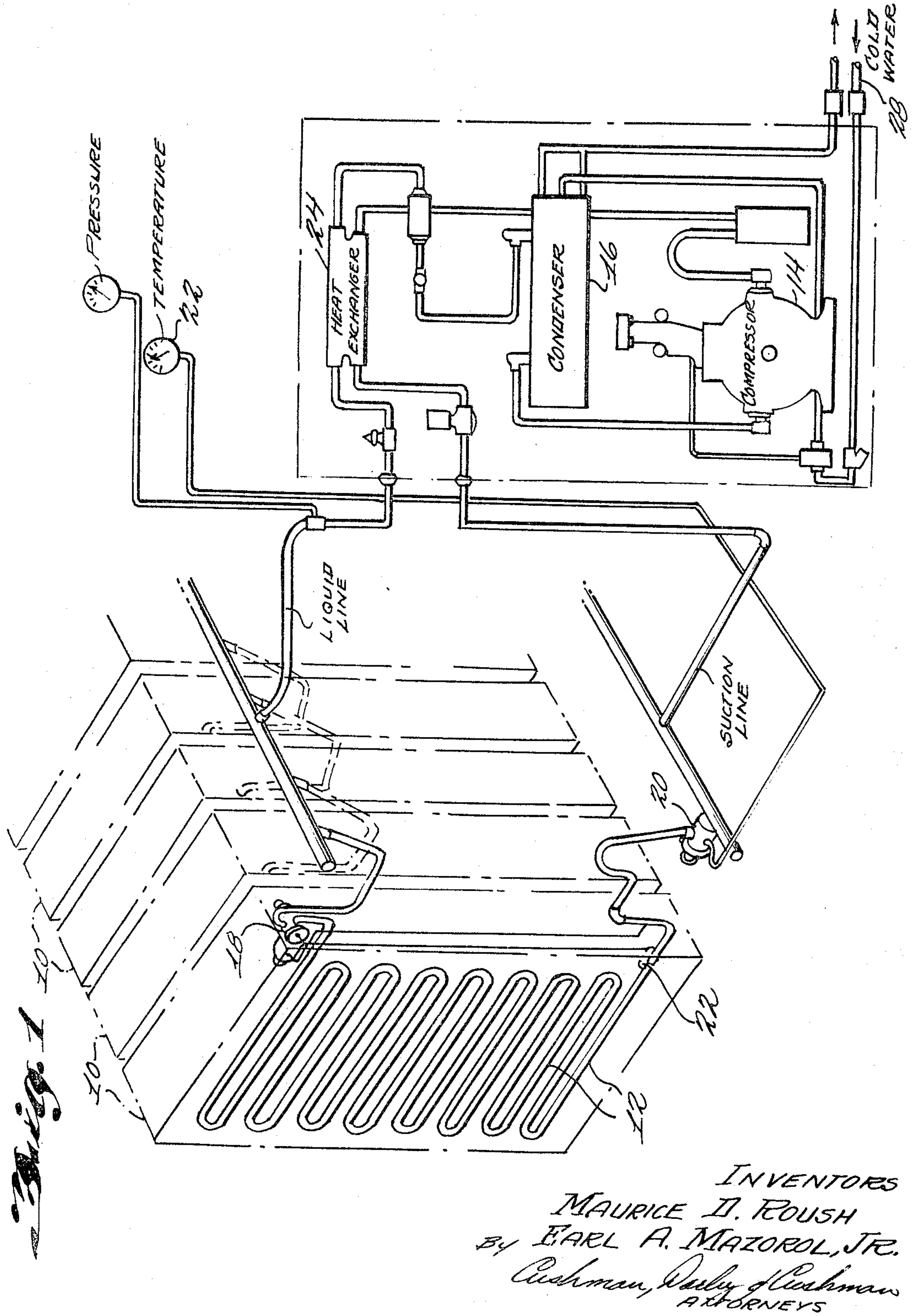
FIGURE 1 is a schematic diagram illustrating the entire cooling system employed in cooling the elements within a computer chassis.

Referring more specifically to the drawings, the structure of the improved cooling system will be described. Illustrated in FIGURE 1 are four similar logic and storage component bearing chassis 10. These four chassis constitute one structural section of a high-speed computer. Within each of the chassis is the principal inventive portion of the cooling system, this portion being the cooling unit, or evaporator 12, comprising a plurality of refrigerant channels extending longitudinally of chassis 10 and interconnected at their ends in a manner to form a series path. External of the computer chassis are the other main portions of the entire refrigeration arrangement, these sections comprising the compressor 14 and the condenser 16. In addition to these principal portions (the evaporator, the compressor and condenser), the cooling system contains additional regulating valves and gauges. These will be described as the operation of the system is briefly set forth. The operation will be described with reference to only one of the chassis, but it will be understood that the process is identical in the remaining chassis since they are connected in parallel with the external portions of the refrigeration system.

Within the cooling system, a liquid refrigerant, such as a fluorinated hydrocarbon, is provided. Liquid refrigerant from the condenser 16 enters the top of the chassis 10 from the liquid line through an expansion valve 18 and passes through the evaporator 12 within the chassis. The expansion valve, in conjunction with a pressure regulator valve 20 at the bottom of the chassis, controls the refrigerant flow in evaporator 12. This flow is determined by a thermostatic element 22 which reads the outgoing refrigerant temperature at the bottom of the evaporator. Element 22 controls the operation of the expansion valve 18 to monitor the amount of refrigerant supplied to the chassis. Pressure in the evaporator is maintained constant by valve 20 to which chassis pressure and temperature gauges are connected. The channels which comprise evaporator 12 are mounted within cooling bars which will be described in detail hereinafter. Heat from the logic and storage modules within the chassis is directed to these cooling bars, and as the refrigerant passes through the evaporator 12, the refrigerant temperature rises above its boiling point to cause evaporation thereof thereby lowering the temperature of the cooling bars. The gaseous refrigerant returns to the compressor 14 via the chassis regulator valve 20, the suction line, and the heat exchanger 24. The latter improves the system efficiency and insures that no liquid refrigerant returns to the compressor 14 during operation. The heat exchanger 24 derives its heat from the hot liquid refrigerant produced by condensing the hot vapors from the high pressure output of the compressor 14. The cold suction line, which feeds the compressor, passes through the heat exchanger jacket resulting in a warming of the refrigerant as it passes to the compressor. As the system operates, the compressor 14 removes the vapors from the evaporator 12 and pumps them into the condenser 16. The compressor action increases the pressure and temperature of the vapor such that the hot vapor is condensed into a liquid by transferring heat to cold water passing through the condenser via pipes 28, as indicated. Various controlling valves are provided within the conventional external equipment, but since this portion of the system does not, of itself, comprise the invention, the details thereof will not be described.

Figure 2:
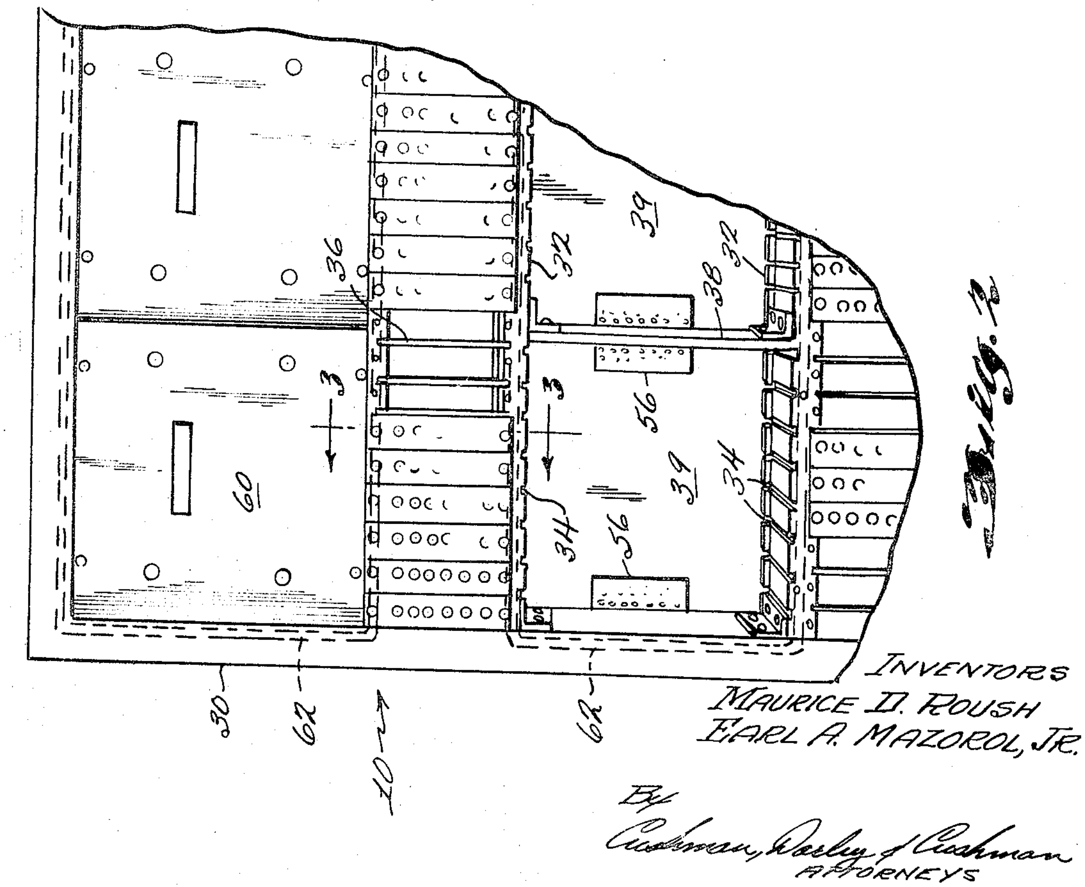
FIGURE 2 is a fragmented front view, in slight perspective, of a portion of a computer chassis within which the inventive portion of the cooling system is housed.

In FIGURE 2, the details of the illustrative embodiment of the chassis structure are set forth. The chassis 10 comprises a main frame 30 within which logic and storage modules may be housed. A plurality of spaced bars 32 extend longitudinally of the chassis mounted by conventional means to the interior of frame 30 as illustrated. These bars are made of metal having high heat conductivity, such as aluminum. The bars 32 are provided with equally spaced transverse slots 34 on the upper and lower surfaces thereof. To form individual compartments for each of the logic modules, a plurality of metallic plates 36, extending the width of the frame, are vertically oriented within the slots 34. To form individual compartments for each of the storage modules, vertical plates 38 of heavier gauge than plates 36, and also extending the width of the frame 30, are attached to the upper and lower surfaces, respectively, of adjacent bars 32. The partitioning plates 38 are also formed of high heat conductive metal. Both plates 36 and 38 serve as heat sink plates as will be described. The storage module compartments of chassis 10 are enclosed at one end by heat conductive sheets of metal 39 attached to frame 30, insulating terminal boards 44 (FIGURE 3) being attached to the exterior of sheets 39 to permit electrical connection of the storage modules.

Figures 3, 4:
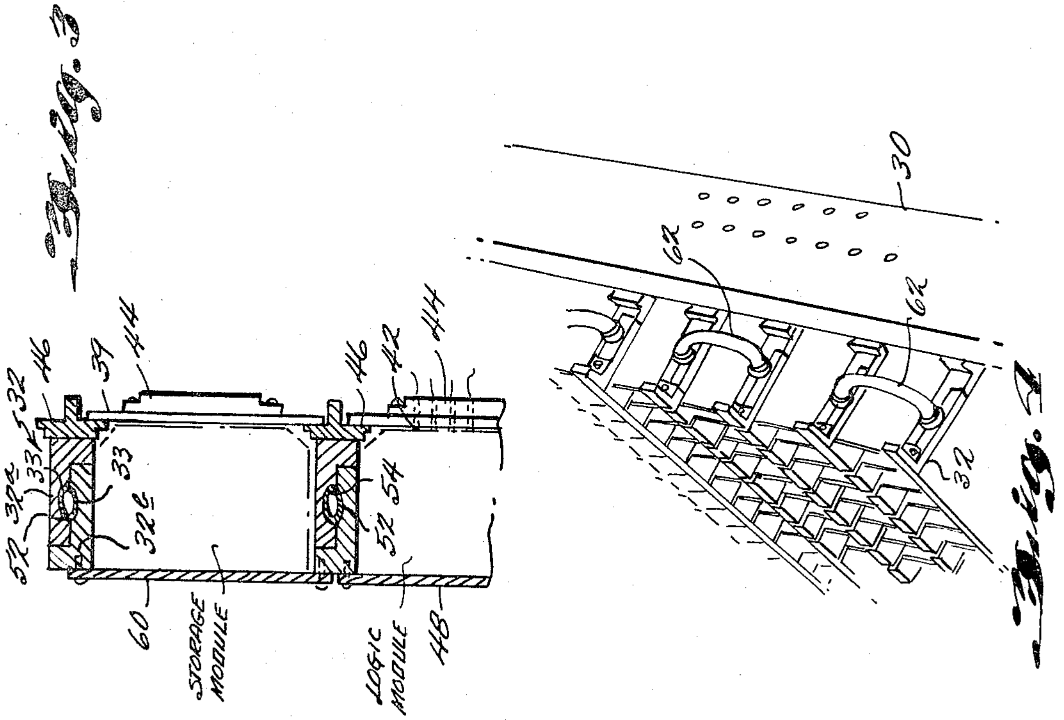
FIGURE 3 is a reduced view in section taken substantially along line 3—3 of FIGURE 2 illustrating the manner in which the cooling elements are mounted within the chassis, the logic and storage modules being generally shown in dash lines for convenience of illustration.
FIGURE 4 is a fragmented view in perspective of a logic module section of a computer chassis illustrating the end connections by which the cooling elements are interconnected.

In FIGURE 3 there is illustrated in dash lines both a logic and a storage module located respectively in their operative positions within compartments generally defined by cooling bars 32 and plates 36 (not shown), and bars 32 and plates 38 (not shown). The logic module comprises a printed circuit including electrical components mounted on a plastic surface, such as an epoxy "board." The printed circuit has a plurality of connector pins 42 engaging corresponding holes of a terminal board 44 formed of a sheet of insulating material and attached to flanges 46 provided on the upper and lower surfaces of bar 32 to enclose one end of the logic module compartment. The attachment is indicated generally as being by a screw arrangement, but it may be assumed that any appropriate fastening system may be utilized. The logic module is provided with an integral face plate 48 of a high heat conductive material which is connected to the outer edge of the module to completely enclose the module within its compartment, the entire unit being attached to the cooling bars 32 by suitable means, such as the screws indicated. With the logic module in the position illustrated, the circuitry components on the module are enclosed by aluminum bars 32, transversely extending plates 36 (not shown), the insulating terminal board 44 and the face plate 48. Accordingly, when power is supplied to the logic module thereby developing heat, this heat passes primarily by conduction from plates 36 and face plate 48 to bars 32. The structure of the storage module is described in detail in Patent 3,278,806 which was granted on Oct. 11, 1966. This module is connected to insulating module terminal boards 56 (FIGURE 2) spaced inwardly of sheet 39 and to the cooling bars 32 by face plates 60 of heat conductive material. The storage module is thereby enclosed by bars 32, transversely extending plates 38 (not shown), sheet 39 and the face plate 60 so that when power is supplied to the module, heat passes primarily by conduction from plates 38, 39 and 60 to bars 32.

Figure 3A:
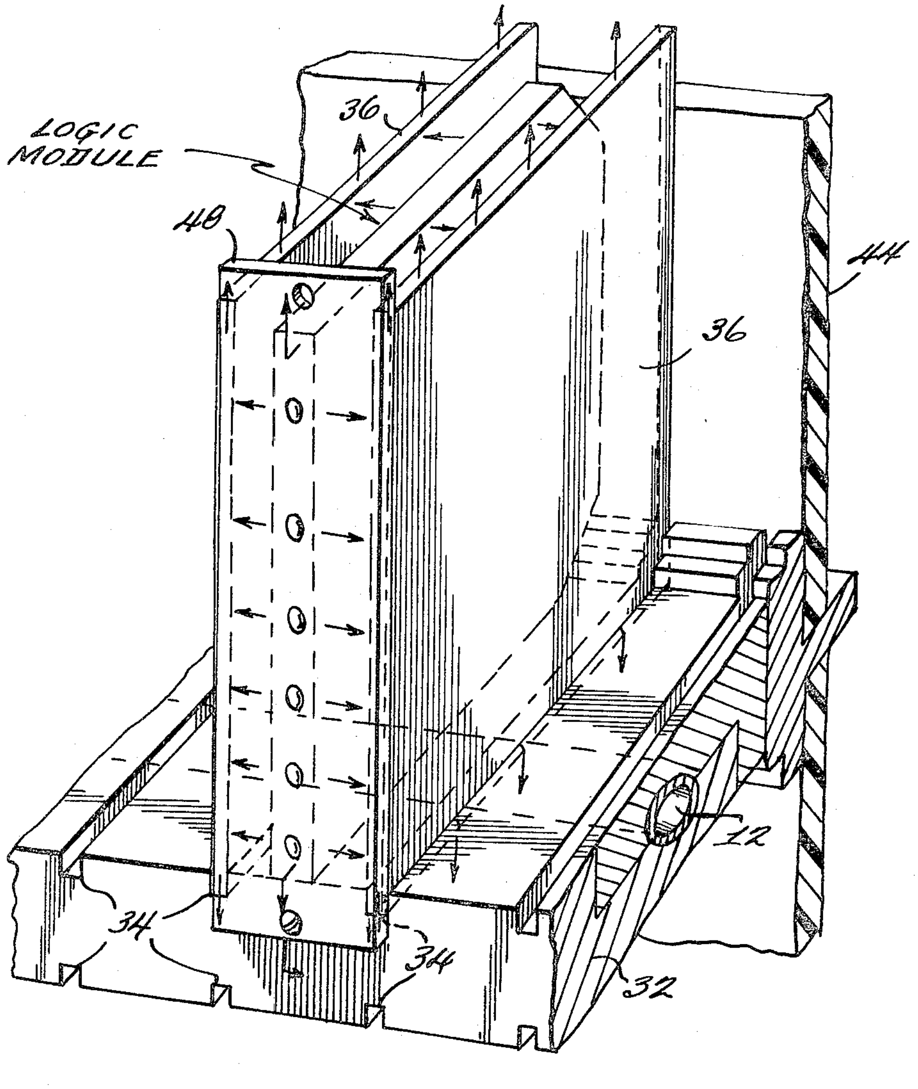
FIGURE 3A is a fragmented diagrammatic view in perspective illustrating the heat transfer paths of a logic module when housed within its individual compartment.

The heat transfer paths can be better appreciated by reference to FIGURE 3A which diagrammatically illustrates a logic module positioned within its individual compartment. For convenience of illustration, the electrical components of the module have been omitted. Similarly, the cooling bar 32 which encloses the top of the module compartment is not shown in order that the heat transfer paths may more clearly be illustrated. As can be appreciated from the arrowheads, when power is supplied to the logic module, the heat generated is transmitted to the plates 36 which are closely spaced from the major surfaces of the module. The plates 36 conduct the heat to cooling bars 32 which form the top and bottom of the module compartment. Heat is also directly conducted from the logic module through the heat conductive face plate 48 to the cooling bars 32.

As the heat transfer paths for cooling a logic module are analogous to those found in removing heat from a storage module, with the exception that the storage module is enclosed at each end by heat conductive plates and therefore can transfer heat at both its ends, there is no necessity to diagrammatically illustrate the heat transfer paths of a storage module positioned within its individual compartment.

The details of the cooling bars 32 may also be appreciated by reference to FIGURE 3. Each bar comprises a pair of complementary substantially L-shaped sections 32*a* and 32*b*. The horizontally mating surfaces of these sections are provided with aligned longitudinally extending recesses 33 to define an internal channel within bar 32 through which a coolant may pass. Preferably, the channel so formed is elliptical in shape. Extending longitudinally of each of bars 32 within the channels provided therein, cooling pipes 52 are positioned. Each pipe is preferably made of copper tubing, although other conventional materials may be employed. When the cooling pipe is assembled within sections 32*a* and 32*b*, the tubing is squeezed into an elliptical shape for maximum contact with the sections thereby effecting improved heat transfer properties. In operation, heat directed to bars 32 as previously described, is transmitted to the cooling pipes 52 through which the liquid refrigerant is passed. This heat is absorbed by the refrigerant as the latter is evaporated.

Since each module is individually housed within a separate compartment, the structural arrangement just described provides means for cooling each of the logic and storage components individually.

The preferred embodiment of the invention contemplates that the cooling pipes 52 within the individual cooling bars 32 be connected in series. This is accomplished by connecting the end of a pipe in one cooling bar 32 to the end of a cooling pipe in an adjacent bar. This is illustrated at 62 in FIGURE 2. However, to more clearly disclose this concept, an additional illustration, FIGURE 4, has been provided. It must first be stated that FIGURE 4 does not depict the relative arrangements of storage and logic modules illustrated in FIGURES 2 and 3. Instead, for convenience of illustration, FIGURE 4 shows a stacked arrangement of logic module compartments. The sole purpose of this drawing is to illustrate the connections 62 of alternate pairs of cooling pipes. These connections can be viewed due to the fact that a portion of frame 30 has been removed from its normal position covering the ends of the rows of modules (see FIGURE 2). Of course, the opposite ends of the cooling bars are similarly joined by connections 62 in conventional fashion to develop a generally S-shaped configuration of cooling pipes. It should be appreciated, however, that other cooling pipe interconnection patterns may appropriately be utilized rather than the series arrangement disclosed in detail herein.

In addition to providing individual compartments for each of the logic and/or storage modules to improve the cooling of the modules, the arrangement of the high heat conductive plates 36 and 38 with respect to the aluminum cooling bars 32 provides the additional feature of electrical shielding for each of the modules housed in the compartments defined by these members. Accordingly, cross-talk between modules is substantially reduced.

The above-described embodiment is illustrative of a preferred embodiment of the invention but is not intended to limit the possibilities of insuring improved cooling within data processing equipment. For example instead of using a two-piece cooling bar structure as previously described, a single element cooling bar having a bore hole therein, to define a channel for passage of a refrigerant, may be employed. In such an embodiment, no separate cooling pipe would be required.

The cooling system disclosed herein is an example of an arrangement in which the inventive features of this disclosure may be utilized, and it will become apparent to one skilled in the art that certain modifications may be made within the spirit of the invention as defined by the appended claims.

What is claimed is:

1. In a high-speed computer employing chassis-mounted logic and/or storage modules for processing and storing data, an improved cooling system including a frame member comprising a portion of said chassis, a plurality of heat-conductive spaced bars extending longitudinally of said frame and attached thereto, a plurality of spaced, heat-conductive plates mounted between said bars at substantially right angles thereto and extending substantially the entire width of said bars to divide said frame into individually accessible module compartments; each of said bars having an internal channel therein; and means for passing liquid refrigerant through said channels to remove heat transmitted to said bars from modules positioned within said compartments.

2. A cooling system according to claim 1 wherein said bars are provided with spaced transverse slots, the ends of said plates being mounted therein; a sheet of insulating material enclosing one end of each module compartment; and a heat-conductive face plate adapted to be connected to a logic module, said face plate being attached to said bars to completely enclose an individual compartment.

3. A cooling system according to claim 1 further comprising: a heat-conductive sheet enclosing one end of each module compartment; and a heat-conductive face plate adapted to be connected to a storage module, said face plate being attached to said bars to completely enclose an individual compartment.

4. A cooling system according to claim 1 further comprising means mounted with respect to said chassis to interconnect the internal channels of each bar.

5. A cooling system according to claim 1 wherein each of said bars comprises a pair of complementary substantially L-shaped sections, said sections having longitudinally extending recesses therein aligned to define said internal channel therein.

6. A cooling system according to claim 5 wherein said channels are elliptical in shape.

References Cited

UNITED STATES PATENTS

| | | | |
|---|---|---|---|
| 2,405,722 | 8/1946 | Villier | 165—180 X |
| 3,033,440 | 5/1962 | Ruppright | 230—45 |
| 3,141,999 | 7/1964 | Schneider | 165—80 X |
| 3,198,991 | 8/1965 | Barnett | 317—100 |
| 3,209,208 | 9/1965 | Francis et al. | 317—100 |

FOREIGN PATENTS 888,944 2/1962 Great Britain.

ROBERT A. O'LEARY, *Primary Examiner.*

A. W. DAVIS, *Assistant Examiner.*